(12) United States Patent
Greenyer

(10) Patent No.: US 9,102,407 B2
(45) Date of Patent: Aug. 11, 2015

(54) RESONANCE ENGINE

(75) Inventor: Guy Thomas Greenyer, West Sussex (GB)

(73) Assignee: MapleBird Ltd, Brighton (GB)

( * ) Notice: Subject to any disclaimer, the term of this patent is extended or adjusted under 35 U.S.C. 154(b) by 103 days.

(21) Appl. No.: 13/515,503

(22) PCT Filed: Dec. 15, 2010

(86) PCT No.: PCT/GB2010/052100
§ 371 (c)(1),
(2), (4) Date: Jun. 13, 2012

(87) PCT Pub. No.: WO2011/073659
PCT Pub. Date: Jun. 23, 2011

(65) Prior Publication Data
US 2012/0248243 A1    Oct. 4, 2012

(30) Foreign Application Priority Data

Dec. 18, 2009 (GB) .................................... 0922168.0

(51) Int. Cl.
*B64C 33/02* (2006.01)
*B64C 39/02* (2006.01)

(52) U.S. Cl.
CPC .............. *B64C 39/028* (2013.01); *B64C 33/02* (2013.01); *B64C 2201/025* (2013.01)

(58) Field of Classification Search
CPC ....................................................... B64C 33/02
USPC .................... 244/72, 11, 22, 99.8; 446/35
See application file for complete search history.

(56) References Cited

U.S. PATENT DOCUMENTS

| | | | | |
|---|---|---|---|---|
| 2,810,985 A | * | 10/1957 | Bilder | .............................. 446/56 |
| 3,728,814 A | * | 4/1973 | Ruston | .............................. 446/35 |
| 5,956,292 A | * | 9/1999 | Bernstein | ....................... 367/140 |
| 6,082,671 A | | 7/2000 | Michelson | |

(Continued)

FOREIGN PATENT DOCUMENTS

| | | | | |
|---|---|---|---|---|
| FR | 2797844 A1 | * | 3/2001 | .............. B64C 33/00 |
| GB | 2438242 | | 11/2007 | |
| JP | 2003-135866 | | 5/2003 | |

OTHER PUBLICATIONS

Combined GB Search and Examination Report for corresponding GB Application No. 1021299.1, dated Apr. 6, 2011.

(Continued)

*Primary Examiner* — Brian M O'Hara
*Assistant Examiner* — Jessica Wong
(74) *Attorney, Agent, or Firm* — Renner, Otto, Boisselle & Sklar, LLP

(57) ABSTRACT

A resonance engine is disclosed including: a driver plate, to which is coupled at least one oscillatory transducer; a drive signal generator connected to the oscillatory transducer for excitation thereof; a first spring-mass resonator, having a first natural resonant frequency, with a proximal end attached to the driver plate and a free distal end; and a reaction means attached to the driver plate substantially opposite to the first spring-mass resonator. When the oscillatory transducer is excited by a drive signal from the generator having a component at or close to said natural resonant frequency, the first spring-mass resonator oscillates at resonance, substantially in anti-phase to the driver plate. Small vibrational strains in the oscillatory transducer are converted to large strains of controllable kinematic movements.

13 Claims, 13 Drawing Sheets

(56) References Cited

U.S. PATENT DOCUMENTS

| | | | |
|---|---|---|---|
| 7,204,455 B2* | 4/2007 | Sinclair | 244/72 |
| 7,341,222 B1* | 3/2008 | Reuel et al. | 244/11 |
| 8,382,546 B2* | 2/2013 | Van Ruymbeke | 446/35 |
| 2002/0117583 A1 | 8/2002 | Hamamoto et al. | |
| 2006/0144994 A1* | 7/2006 | Spirov et al. | 244/62 |
| 2008/0136292 A1 | 6/2008 | Thiesen | |
| 2008/0223993 A1* | 9/2008 | Spirov et al. | 244/23 A |
| 2013/0320133 A1* | 12/2013 | Ratti et al. | 244/22 |

OTHER PUBLICATIONS

GB Examination Report for corresponding GB Application No. 1021299.1, dated Nov. 30, 2011.

* cited by examiner

RESONANCE ENGINE

This application is a national phase of International Application No. PCT/GB2010/052100 filed Dec. 15, 2010, and published in the English language as WO 2011/073659 A1 on Jun. 23, 2011.

FIELD OF THE INVENTION

This invention relates to a resonance engine, which is particularly suitable for ornithopter flying devices known as nano air vehicles (NAV), and especially to miniature multi-modal electromechanical insects capable of flying and terrestrial locomotion.

BACKGROUND TO THE INVENTION

Creating efficient and controllable, insect sized NAVs that are capable of controlled, hovered flight and terrestrial locomotion is proving a considerable challenge. A NAV's scale as generally understood in the industry is defined as being less than 7.5 cm wingspan and 10 g in weight, however current design efforts are aimed at smaller scales less than 3 cm wingspan and 1 g in weight.

A NAV engine's thrust-to-weight ratio needs to be high enough as is required to lift the power source and control electronics, this being increasingly difficult to achieve with decreasing scale due to the non-linear scalability of component power densities. To keep the thrust-to-weight ratio high and power consumption low, it becomes increasingly important to have efficient motor and transmission systems for both aerial and terrestrial locomotion. As the NAV scale decreases, the wing beat frequency often needs to be disproportionably increased to maintain comparable performance. Higher wing beat frequencies offer more efficient lift and improved flight stability in windy conditions but the increased frictional energy losses in the motor and transmission systems have a detrimental consequence for efficiency, and engine longevity as related to structural fatigue engine failure.

Typical NAV research and prototypes for micromechanical insect engines less than 100 mg employ the use of complex kinematic pair transmissions, with flexure lever joints to amplify the small deflections from one or more suitable electromechanical transducers, transforming electrical energy into complex wing kinematics suitable for insect inspired flight. Piezoelectric materials, shape memory materials, dielectric elastomer and electrochemical actuators are amongst the electromechanical transducers being explored.

The capacity of the NAV's battery or cell needs to be such that the NAV can perform useful flight durations. For a remote control indoor toy fly, 2-3 minutes of flight may suffice but for commercial aerial photography, flight duration times of one hour plus would be beneficial. Therefore, for most practical uses the power source is a heavy component to lift.

The difficulties in creating sufficient thrust-to-weight engine performance, at progressively smaller scales of typically less than 3 cm wingspan, is driving a considerable effort in the industry, to reduce motor, airframe and transmission weight whilst increasing strength and power density.

Typically, when a NAV's required wing kinematic uses more degrees of motion to implement flight control parameters, further transmissions, actuators and associated electronics are added, so adding to the engine's weight and reducing its power density. If more appendages, such as legs with terrestrial locomotion, are added, this again can substantially increase the weight the NAV must sustain in flight.

Operability under natural flight conditions of rain, dust, heat and cold is another area of concern. Flexure-lever kinematic pair transmissions can easily suffer particle damage from sand and dust unless in a protective enclosure that adds weight. Temperature fluctuations and rain effects on transmissions can also prevent flight. Currently, NAV scaled ornithopter mechanisms use some form of kinematic pair transmission with fairly constrained degrees of movement; thus, they tend to suffer from increased friction, due to higher bearings loads from constrained incompliant moments of torque. In addition, such mechanisms require a strong, and therefore relatively heavy, airframe on which to mount the kinematic pair transmission(s) for reaction there against. These flapping systems often benefit from operating at resonance, which reduces frictional losses and means that the systems operate with greater efficiency than otherwise. However, due to the constrained movements of the kinematic pair transmission(s), the systems do not directly benefit from resonance to amplify and convert efficiently small strains to large strains of desired wing kinematics. Rather, the amplification of movements, from small deflections of an actuator to larger deflections of a wing, is achieved mechanically through the flexure-lever kinematics.

Other known NAV devices use chemical actuation to operate the appendages (wings).

These engine design challenges noted above are preventing the emergence of a practical NAV.

Resonant frequencies are normally avoided in any physical product, as they can lead to catastrophic structural failures. However, by appropriately controlling mechanical resonance through frequency and amplitude modulation, useful mechanical deflections of specific magnitude and direction can be generated on demand for powering wings and/or legs on a micromechanical insect NAV.

SUMMARY OF THE INVENTION

To overcome the inefficiencies and problems of the prior art as noted above, a resonant engine, herewithin referred to as a Resonant Movement Amplifier (RMA) is proposed.

According to the invention, there is provided a resonant engine, comprising:
  a driver plate, to which is coupled at least one oscillatory transducer;
  a drive signal generator connected to the oscillatory transducer for excitation thereof;
  a first spring-mass resonator, having a first natural resonant frequency, with a proximal end attached to the driver plate and a free distal end; and
  a reaction means attached to the driver plate substantially opposite to the first spring-mass resonator;
  wherein when the oscillatory transducer is excited by a drive signal from the generator having a component at or close to said first natural resonant frequency, the first spring-mass resonator oscillates at resonance, substantially in anti-phase to the driver plate.

Through the provision of a reaction means, and by having a suitably tuned spring-mass resonator, energy input to the transducer is transformed into deflection of the resonator, in particular into amplified movement of the free distal end thereof, in preference to being transformed into deflection of the driver plate.

The drive signal generator may be adapted to generate electrical signals of variable harmonic content, which is to say that it can generate cyclical electrical signals having a frequency and amplitude that can each be varied. For example, the drive signal may be an AC sine wave, or the sum of two or more sine waves. Such a variable signal can be used to control the engine.

The reaction means preferably comprises a second spring-mass resonator mounted substantially symmetrically to the first spring-mass resonator on the driver plate. An alternative embodiment could instead use a weight mounted at an opposite point on the drive plate to the first spring-mass resonator, the first spring-mass resonator reacting against the inertia of the weight in order to resonate. Where such a weight is used, the weight could, preferably, be formed from ancillary components of the engine, such as a power source. Through the use of a substantially symmetrical second spring-mass resonator, construction is simplified, and the weight of the engine can be minimised, which is particularly important for flying applications. The first and second spring-mass resonators react against each others' moments of torque in an anti-phase relationship through the driver plate when sympathetically excited by the driver plate's oscillations at or near the natural resonant frequencies of the resonators. In so doing, the first and second spring-mass resonators so present at opposite ends of the driver plate a substantially anti-phase strain relationship with the driver's strain components, thus limiting the driver plate's oscillating stress-strain components to mostly oscillating stress. Accordingly, the driver plate does not exhibit wide oscillating strain deformations and the majority of the oscillating energy in the driver plate is transferred to the spring-mass resonators through oscillating stress in the driver plate, which is converted into oscillating deflection (i.e. strain) in the resonators. This mode allows for progressively wider oscillating strains to be amplified along the length of the said resonators without excessive driver deformation or the need to attach the engine to a ground or a base mass for energetic mechanical oscillations to react against.

Preferably, the second spring-mass resonator, as measured in isolation, has a second natural resonant frequency, different to the first natural resonant frequency. By having the first and second resonators tuned to slightly different natural resonant frequencies, the first resonator can be excited in preference to the second resonator, and vice versa. For example, if the drive signal contains a component at the natural resonant frequency of the first resonator, then the first resonator will operate at an increased amplitude compared to the second resonator. The opposite holds true also. Moreover, if the drive signal contains a component having a frequency falling between the natural resonant frequencies of the first and second resonators, then the resonators' frequencies will tend to lock, as explained more thoroughly in the detailed description.

In a preferred embodiment, the spring of the or each spring-mass resonator, together with the driver plate, comprises a Z-bend when viewed in the plane of the driver plate, the proximal end of the Z-bend being contiguous with the driver plate. This configuration has particular advantages, as will be described in greater detail in the detailed description.

The driver plate and the spring of the first spring-mass resonator may be formed integrally with one another as a unitary piece. Similarly, the spring of the second spring-mass resonator may be formed integrally with the driver plate. All three components may be integrally formed. These embodiments have the advantage of reducing parts counts, avoiding potential weaknesses at coupling points between components, and enabling manufacturing techniques that might not otherwise be possible. For example, the driver plate, first and second spring-mass resonators may be integrally formed from a composite material.

By including the engine, mechanisms and control for driving wings and or legs, preferably within a single continual shaped composite RMA part, and by sharing the transducer for all wing and leg motor functions, the complexity, weight and size of the motor, airframe and transmissions of a NAV is substantially reduced, thus offering high power density, strength and durability.

In some embodiments, a discrete mass may be attached at or near the free distal end of the or each spring-mass resonator. In order to tune the spring-mass resonator(s) to a particular frequency, one of the critical parameters is the mass of the resonator. If the mass of the spring component alone is not sufficient, or is not properly distributed, then it can be supplemented by an additional mass, preferably attached toward the free end of the spring.

The first spring-mass resonator typically further comprises a damper mounted at the free distal end of the spring, thereby forming a first spring-mass-damper system capable of doing work. The damper may take various forms, including: a mass for engagement with ground (for terrestrial locomotion); a fin (for thrust in a liquid medium); or a wing (for thrust in a gaseous medium, such as air.)

In embodiments having the second spring-mass resonator, it too may further comprise a damper mounted at the free distal end of its spring, thereby forming a second spring-mass-damper system capable of doing work. Alternatively, the second resonator may not have a damper attached to its end, in which case the function of the second spring-mass-resonator is to function as the reaction means. In the latter embodiment, if the first spring-mass-damper system includes a wing, then that single wing will produce a rotating flight.

As with the damper of the first spring-mass-damper system, the damper of the second spring-mass-damper system may comprise a mass, a fin or a wing. Where each of the first and second spring-mass-damper systems comprise a wing, the two wings may be attached so as to face in the same direction as one another (as in nature), or may instead be attached so as to face in opposite directions (in which case a rotary motion would be induced).

The rotary embodiments have the advantage of extra stability, due to the gyroscopic forces involved. Moreover, due to the angle of attack of the wing or wings as they turn through the air, additional lift may be produced.

Further additional spring-mass resonators may be attached to the driver plate. These additional resonators may each include respective dampers. In particular, additional pairs of wings may be added. Additionally or alternatively, the additional resonators may comprise legs extending to make contact with the ground. The legs are vibratable in a manner to produce terrestrial locomotion The or each additional spring-mass resonator may have a respective natural resonant frequency that is different to that of the first spring-mass resonator (and that of the second spring-mass resonator, or that of any of the other spring-mass resonators). As discussed above with respect to the relative natural frequencies of the first and second resonators, this variance in natural frequency means that selected resonators may be excited in preference to others by varying the components of the drive signal. Specific examples of how this may be exploited in order to control motion follow in the specific description.

The oscillatory transducer may comprise at least one material selected from the group consisting of: a piezoelectric material; a dielectric elastomer material; an electromechanically active material; an electromagnetic-mechanically active material; a source of nuclear direct collected-charge-to-motion induced oscillation.

In some embodiments, the driver plate and the oscillatory transducer may be formed integrally as a unitary piece. In other words, the driver plate itself may form the oscillatory transducer. This is possible where the driver plate is formed, for example, from piezoelectric material, a dielectric elastomer material, or if it comprises a composite with integral active inclusions. Such a unitary piece may further be unitary with the springs of the resonator(s), thereby forming a one-piece engine. These embodiments have the advantage of reducing parts counts, avoiding potential weaknesses at coupling points between components, and enabling manufacturing techniques that might not otherwise be possible.

At least one on-board power source, selected from the group comprising: a battery; a rechargeable battery; a nuclear battery; a cell; a rechargeable cell; a solar cell; a fuel cell, may be included.

Typically, the at least one power source is rechargeable by at least one energy source selected from the group consisting of: light impinging on said solar cell; electricity generated through external vibrational stimulus of said piezoelectric transducer; radio-isotopic decay; fuel for the fuel cell; electricity generated by a heat differential; direct electrical coupling to an electrical charger.

Additionally or alternatively, the engine may further comprise an on-board receiver (which may, for example, be an induction coil, a photosensor, an aerial, or the like) adapted to receive and rectify external electromagnetic energy into electrical energy. A hybrid energy source, comprising combinations of any of the above-mentioned power sources, may be employed.

Of particular significance to embodiments of the engine having wings for flight, is the weight of the engine and associated ancillary components. A light-weight power source conventionally means a limited power supply, so limiting flight times. This can be mitigated against by enabling the power source to be recharged, such as by the means listed above.

In some embodiments, the resonant engine includes a stress or strain sensor connected to the driver plate to detect stresses and/or strains thereof. This can be used to diagnose the engine's operation, as explained more fully in the detailed description.

In some embodiments, the resonant engine may include at least one sensor selected from the group consisting of: an attitude sensor; a position sensor; a direction sensor; a motion sensor; a location sensor; an inertial sensor; a gyro sensor; a magnetic sensor; a light sensor; a proximity sensor; a scanning sensor; an altitude sensor; a camera. The output(s) from the at least one sensor can be used in a feedback loop to the drive signal generator, to control operation of the engine. Preferably, in certain embodiments, the at least one sensor is capable of detecting the engine's rotational orientation with respect to a fixed frame of reference. In such an embodiment, which has particular utility for the configurations in which the engine generates rotational flight, an output from the at least one sensor to detect rotational orientation is fed to the drive signal generator in a feedback loop so as to synchronise drive signals from the generator with rotation of the engine. This can be used to maintain the engine in a particular orientation. Additionally or alternatively, the output may be used by other components in order to overcome the rotational effects. For example, a camera may receive the signal in order to synchronise image capture with a particular orientation of the engine, thereby being able to image a stationary object even when the camera is rotating with the engine.

In certain of the rotary embodiments, the resonant engine may be mounted to a second such engine by a rotary coupling. Preferably, the second engine is configured (i.e. the wing(s) are mounted) so as to rotate in the opposite sense to the first engine, whereby the second engine can be controlled so as to hold a fixed rotational position with respect to a fixed frame of reference.

Whereas the engine may include all components required in order to operate in an automated, stand-alone manner, in some embodiments, the resonant engine includes means to operate the drive signal generator remotely. This function enables the engine to be operated remotely, for example by a human or virtual operator. In contrast to embodiments where all operation is stand-alone, this also enables certain components to be left off the engine, thereby minimising its weight.

Where the engine has more than one spring-mass resonator, the various spring-mass resonators are preferably so tuned and arranged that the torque force moments generated by the respective spring-mass resonators substantially cancel each other out and substantially cancel out the torque force moments of the driver plate, thereby resulting in a system in which substantially all energy input to the driver plate is transmitted to the spring-mass resonators for defection of the free distal ends thereof, rather than resulting in substantial deflections of the driver plate. In this manner, optimum efficiency, combined with effective control, is achieved. Moreover, it is not necessary to rely on ancillary reaction means (such as positioned weights), which would have obvious deleterious effects for embodiments involving flight.

BRIEF DESCRIPTION OF THE DRAWINGS

The invention will be described, by way of example, with reference to the accompanying drawings, in which.

DETAILED DESCRIPTION

In the following specific description, various embodiments of nano air vehicles (NAVs) are described. Common to each of these embodiments is a resonance engine that operates on a principle of amplifying relatively small oscillations of an oscillatory transducer into relatively large deflections of the free end of at least one spring-mass resonator. Such a resonance engine will be referred to herein as a resonant movement amplifier (RMA).

Whereas the description of the RMA is given in the context of NAVs, it will be understood that the RMA could readily be applied to other applications. For example, the wings could be replaced by fins for a (nano) vehicle capable of 'swimming' through liquid.

Also, whereas the technology has particular benefits for such nano-scale applications, it is scaleable, so a suitably adapted RMA could be used to drive larger vehicles also.

Figure 1A:
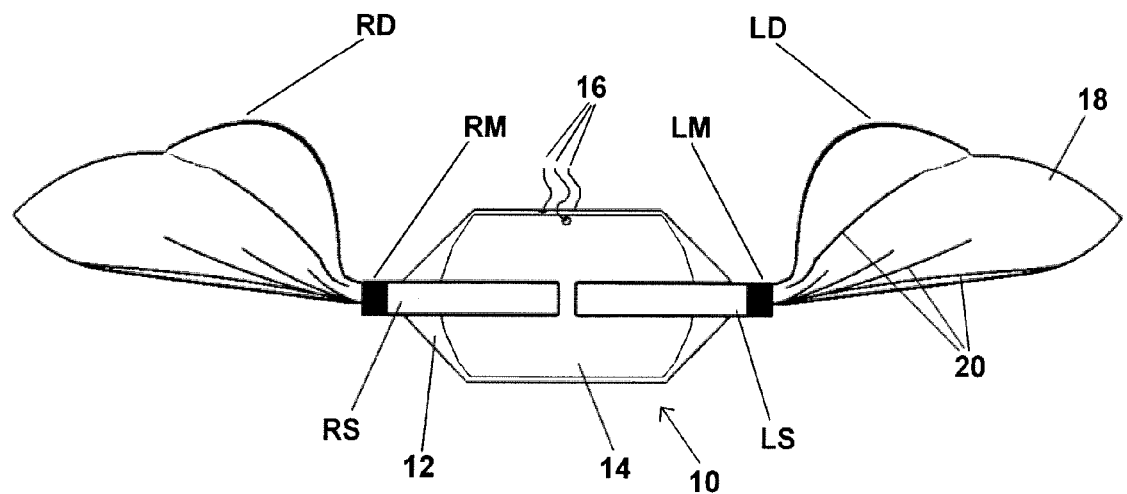
FIGS. 1A and 1B are respective plan and front elevation views of a NAV having a resonant engine in accordance with a first embodiment of the present invention.
Figure 1B:
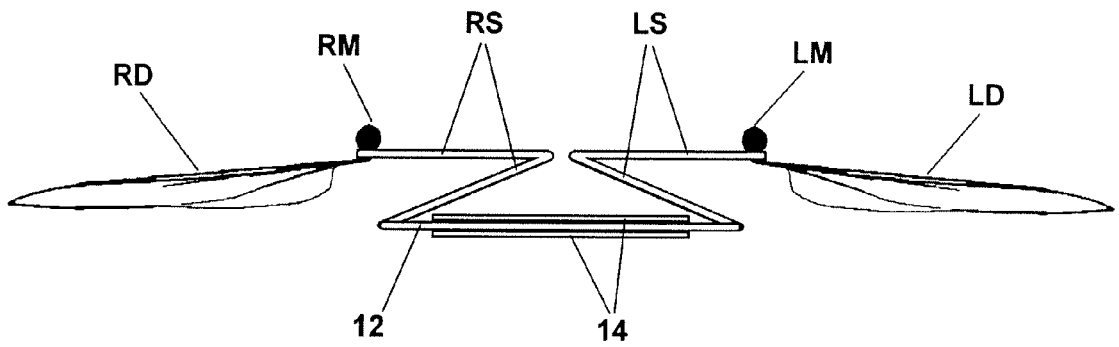
Figure 1C:
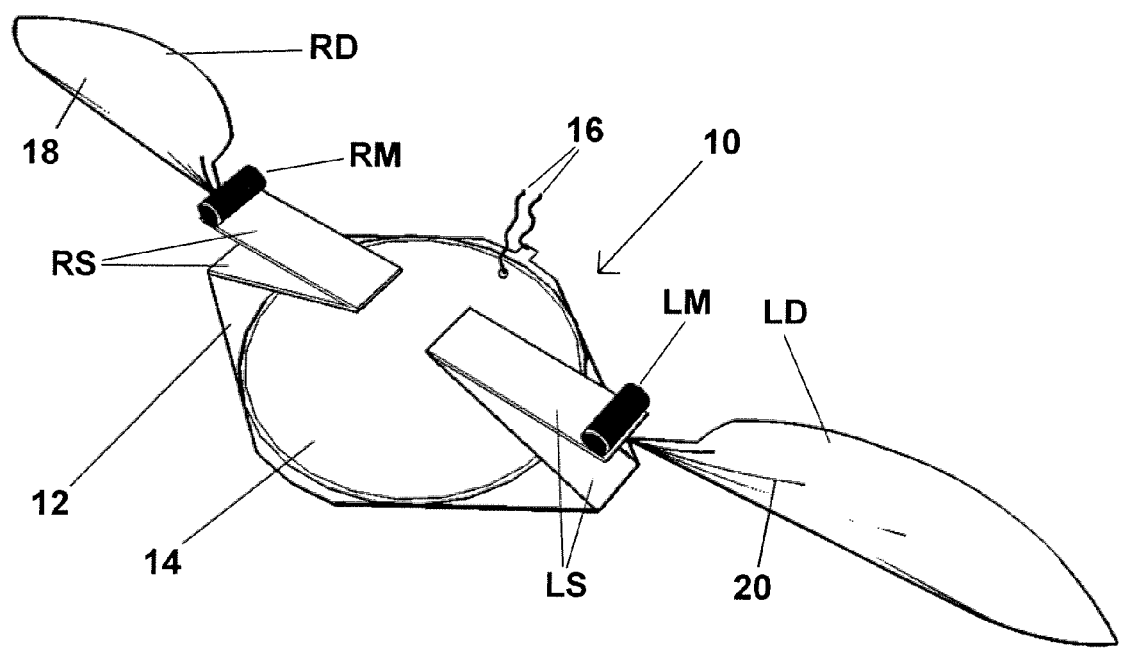
FIG. 1C is an isometric view of the NAV of FIGS. 1A and 1B.

A first embodiment of a NAV 10, emulating a fly or bee-like insect, is shown in FIGS. 1A-C. The NAV 10 has a body of light weight, high tensile modulus material comprising a driver plate 12 with a right spring RS and left spring LS emanating symmetrically from opposite sides thereof. An oscillatory transducer 14, such as piezoelectric material or other electro-mechanically responsive material is coupled to the driver plate 12, for example by bonding. There may be a single such transducer on a top side or a bottom side of the driver plate 12, or there could be a pair of such transducers on the opposite top and bottom sides (as illustrated). A set of electrodes 16 is electrically connected to the transducer 14 for supplying electrical drive signals from a drive signal generator (not shown) to excite the transducer.

The or each transducer may be a unimorph (i.e. it tends to bend in just one direction away from a rest position) or a bimorph (i.e. it tends to bend alternately to opposite sides of a rest position).

When viewed in the plane of the driver plate 12, each spring-mass resonator, together with the driver plate, comprises a Z-bend in which the proximal end of the Z-bend is contiguous with the driver plate 12.

Whereas the illustrated Z-bend springs have been proven to be particularly well suited to this application, it will be understood that other configurations are also possible.

Attached to the free ends of the left spring LS and right spring RS are a left wing LD and a right wing RD, each comprising a membrane 18 and supporting veins 20.

Also attached to the free ends of the left spring LS and right spring RS are discrete masses LM and RM. The springs LS and RS, together with the associated masses LM and RM, form spring-mass resonators that are mechanically excited at their natural frequencies by the driver plate 12 as excited by the oscillatory transducer 14. The spring-mass resonators, in combination with the associated wings LD and RD, together form spring-mass-damper systems, each having a natural resonant frequency as measured in isolation.

The isolated natural resonant frequency of each spring-mass-damper system is affected by factors such as its dimensions, weight, weight distribution, tensile modulus, inertia, wind resistance (where the damper is a wing), etc. As such, the resonant frequency can be tuned by altering one or more of those parameters. It should be noted that the discrete oscillator masses LM and RM may not be required if the masses of the left spring LS and right spring RS, and/or the left wing LD and right wing RD masses are of sufficient oscillator mass that further added mass is not required.

When the oscillatory transducer 14 is excited in use, by the supply of electrical drive signals from the drive signal generator containing at least one cyclical component, the transducer is urged to flex in response to that cyclical component. That, in turn, induces oscillating stresses and strains in the driver plate 12. Those stresses and strains in the driver plate 12 are transferred into deflections of the spring-mass-damper systems and, in particular, into amplified deflections of the free ends of the respective springs LS and RS and therefore of the wings LD and RD. The springs LS and RS thus exhibit wide amplitude oscillating movements at their free ends, with a proportion of their stored energy being tapped off with attached wings LD and RD, that act as resonator dampers and provide lift and thrust along with the wing beat.

The drive signal generator is adapted to generate a drive signal comprising, for example, an alternating current comprising one or more mixed frequency components, usually of sinusoidal shape, at or near the fundamental resonant frequencies of the spring-mass resonators. This alternating current (AC) drive signal, when in tune with the spring-mass resonator's natural frequency, induces an oscillating bending stress in the driver plate 12 as the spring-mass resonators express an anti-phase strain relationship with the driver plate 12 and each other so driver strains largely cancel out, minimizing excessive strains that might otherwise damage the brittle piezoelectric material. This principle allows for a more efficient excitation, as the PZT stress does not need to substantially deform the driver plate 12 to impart powerful momentum to the spring-mass resonator appendages.

The damped resonator springs LS and RS, along with their masses LM and RM, and the wings LD and RD, are so shaped, profiled and positioned that they adopt the preferred oscillating kinematic when excited by an appropriate electrical signal on the electrodes 16. The wing kinematics is a result of the resonators shape, their mass distribution, tensile strength, and the harmonic content of the driver's alternating current electrical drive signal. The resultant kinematics can be various combinations of rotational and or translational movements along several axes as is required for efficient flight and flight control.

The left spring LS and right spring RS, along with the wings LD and RD, also have several degrees of elastic freedom depending on their shape and profile, allowing for passive kinematic compliance to aerodynamic forces that helps with flapping wing kinematics including wing rotation.

To assist with large passive wing tip rotation performed at each change of the wing stroke, the aspect ratio and profile of the arm segments can be optimized to allow for a suitable, width-wise, rotational elastic compliance.

Suitably designed spring-mass resonators can respond to more than one resonant frequency, moving in more than one axis and be independently controllable by the driver's harmonic stress components. For example, a forward and backward wing kinematic component could be produced by adding another frequency component to the driver signal and appropriately forming the resonators to be sensitive to the new frequency in a manor to produce the desired kinematic response.

Optimum wing deflection is achieved when the cyclical component of the drive signal is at or near the natural resonant frequency (or a harmonic thereof) of a spring-mass-damper system.

The natural resonance of the left side resonator LS and LM, is preferably tuned to a similar but slightly different frequency to the right side resonator RS and RM so that the amplitude of deflection of the respective wings can be controlled by varying the drive signals. In free space, and when excited by a single similar driver frequency, the kinematic phase of the left and right sides lock such that the left and right wings, RD and LD, flap with wing beat frequencies that are at the same frequency as each other (possibly at slightly different phase angles). Effectively, the left and right sides together form a single spring-mass resonator system having its own natural frequency. However, the individual components (i.e. the respective left and right sides, flap with varying wing beat amplitudes, depending on how close the driver frequency is to the natural frequency of either the left spring-mass resonator LS and LM, or the right spring-mass resonator RS and RM. This is described in more detail with reference to FIGS. 4A-4D in the context of roll control.

In another embodiment of the invention (not shown), the left spring LS and right spring RS and driver plate 12, are all formed from a piezoelectric material or piezoelectric composite material or other electro-mechanically responsive material so that all these parts are both the driver and resonators, without the use of a separate, bonded transducer 14 of electro-mechanically responsive material.

Figure 2:
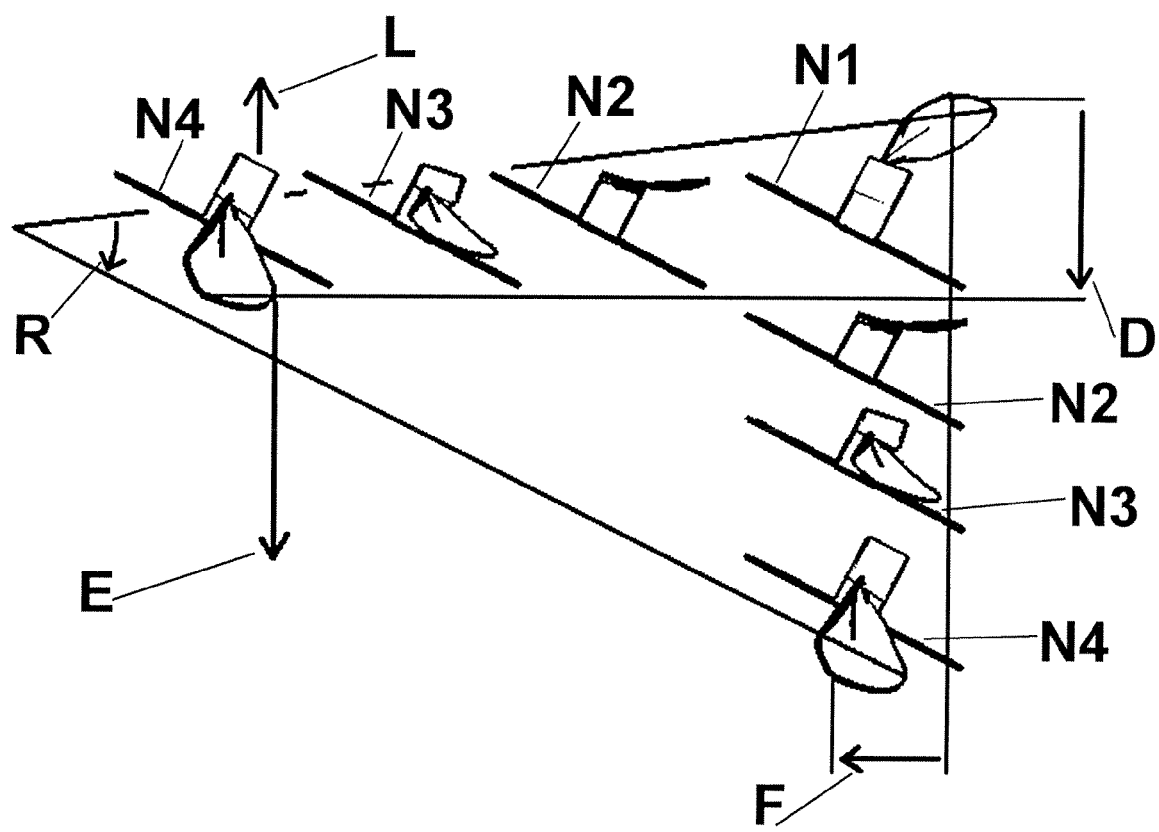
FIG. 2 shows four wing stroke positions of a schematic NAV with its attitude orientated for static hover and revealing the vertical, horizontal and rotational components of the wing and resonator kinematics.

FIG. 2 shows a side view of four down stroke kinematic positions N1-N4 of a NAV with its attitude orientated for static hover, showing the direction of lift L and the net direction of the wing exhaust E. An up down-wing kinematic component D (corresponding to the wing tip amplitude) combines with the forwards-backwards kinematic component F the wing and the wing rotation kinematic component R to provide the basic components of insect-like flight kinematics (due to the above-mentioned passive kinematic compliance, the wing in fact beats with a figure-of-eight type of profile). However, other kinematic components could be realized by using a suitably shaped RMA excited sympathetically with its associated driver frequency stimulus. The amplitude of the up-down kinematic component D is directly proportional to how in-tune the vibratory driver stresses and strains are with the resonator's natural frequency and to the amplitude of the driver signal. Passive wing rotation kinematic R is due to the uneven wing loading on the leading and trailing edge of the wings and is a result of elastic wing deformations and resonator compliant elastic twist.

Figure 3A:
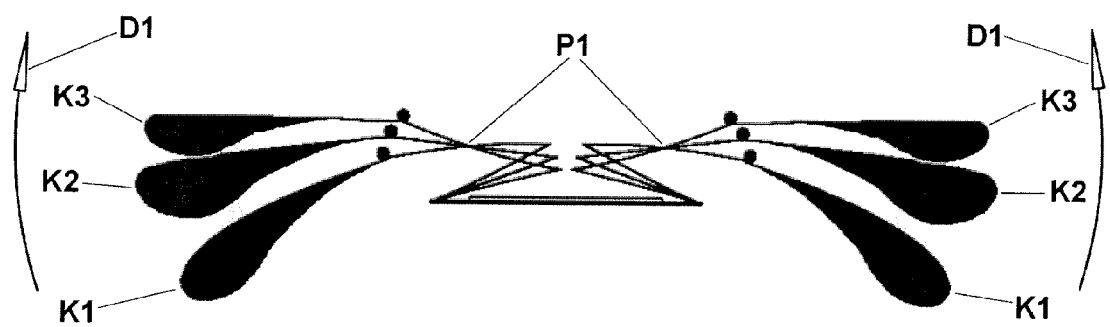
FIGS. 3A and 3B show front elevations of three wing positions in the up stroke and then down stoke.

FIG. 3A shows a front elevation of three kinematic positions of an RMA's up stroke D1 with the wings rotated backwards K1, K2 and K3 and being flapped about a largely rotational point (or node) P1.

Figure 3B:
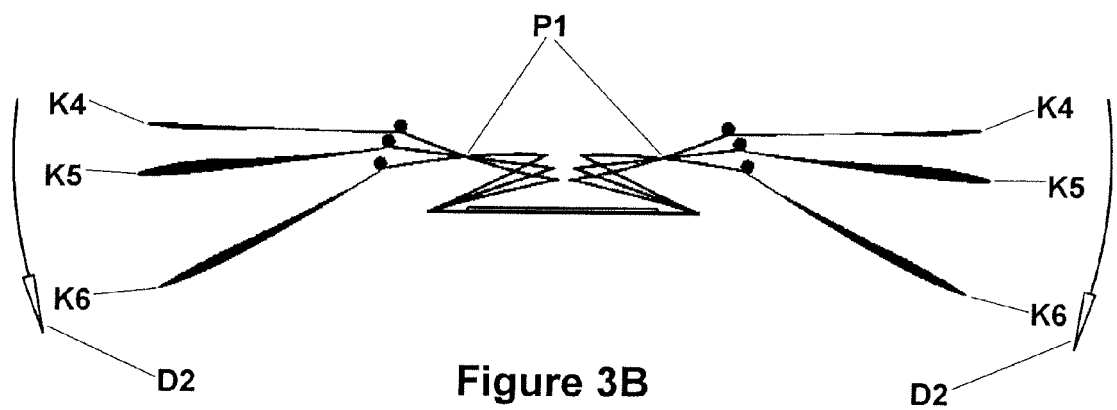

FIG. 3B shows a corresponding front elevation of three kinematic positions of an RMA's down stroke D2 with the wing rotated forwards K1, K2 and K3 and being flapped about a largely rotational point (or node) P1.

FIGS. 4A-4D show, schematically, a NAV 10 controlled with just one driver signal of variable frequency and power (preferably a sine wave), thus offering independent phase-locked, left-right wing stroke amplitude control on demand. By varying the driver power, the amplitude of the wing stroke can be increased or decreased for thrust control; noting that thrust is directly linked to wing stroke amplitude and is in the opposite direction to the wing exhaust.

In fact, experiments have shown that the first and second spring-mass resonators will, in isolation of sufficient independent reaction means (e.g. sufficient weight for which the forces exerted by the resonators to react against), operate effectively as a single resonator system having a locked amplitude with respect to one another. If one spring-mass resonator is tuned to a different natural resonant frequency than another, then the reaction from that other resonator will not fully counteract the forces generated by the first resonator; only partially, or not at all.

For best operation, each spring-mass resonator will comprise part of a set of resonators of the same natural resonant frequency, and positioned so that the forces acting through one component of the set will be balanced out by those through the or each other component of the set. This is described more fully by reference to the embodiment illustrated in FIG. 10. Nevertheless, the principle of controlling flight through having wings responsive to slightly different drive frequencies holds true and is described below.

Figure 4A:
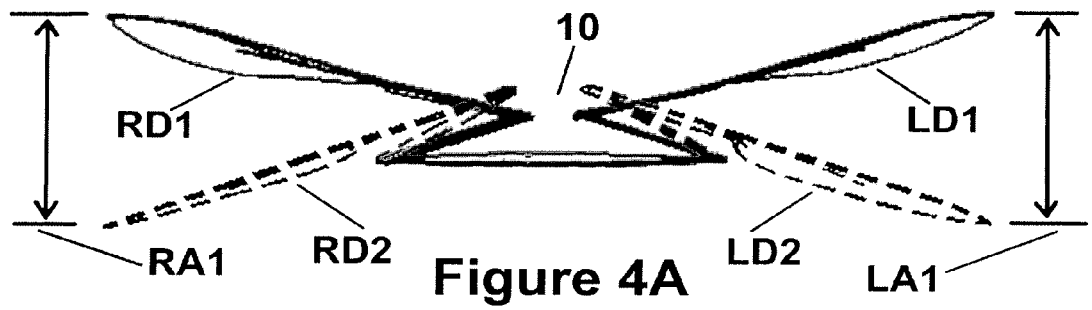
FIGS. 4A-4D each show schematic NAVs in the top and bottom of the wing stroke positions with wing stroke amplitudes for, respectively: high lift, low lift, roll left, and roll right.

FIG. 4A shows the NAV 10 with its driver signal power set high and its frequency set between the natural resonances of its slightly tuned-apart damped resonators, which are depicted at the top of a wide wing stroke RD1 and LD1 and bottom of a wide wing stroke RD2 and LD2, such that the wing stroke amplitudes, RA1 and LA1, are of equal amplitude and therefore provide balanced vertical lift.

Figure 4B:
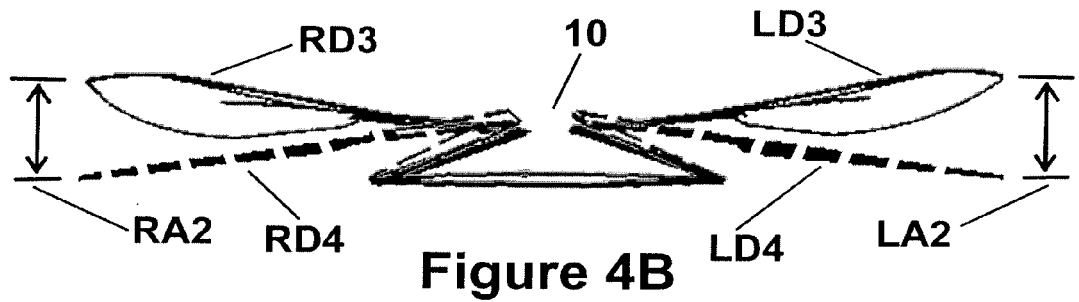

FIG. 4B shows the NAV 10 with its driver signal power set at a lower level than in FIG. 4A. The driver frequency is again set between the natural resonances of its slightly tuned-apart damped resonators, which are here depicted at the top of a narrow wing stroke, RD3 and LD3, and bottom of a narrow wing stroke, RD4 and LD4, such that the wing stroke amplitudes, RA2 and LA2, are of equal amplitude and therefore providing balanced vertical lift, but at a reduced level compared with the drive signal of FIG. 4A.

Broadly speaking, an RMA with substantially symmetrically mounted damped resonators, of similar but slightly tuned-apart natural frequencies, phase-lock in sympathetic resonance to the driver signal frequency and express any un-tuned stress components as a left-right wing stroke amplitude difference and/or phase angle difference. By varying the driver signal frequency between the two damped resonators' natural frequencies, differential left-right wing stroke amplitude can be achieved, useful for roll control. It has been observed that there may be a slight phase angle difference between such locked resonators, but they do resonate with the same frequency as one another.

Figure 4C:
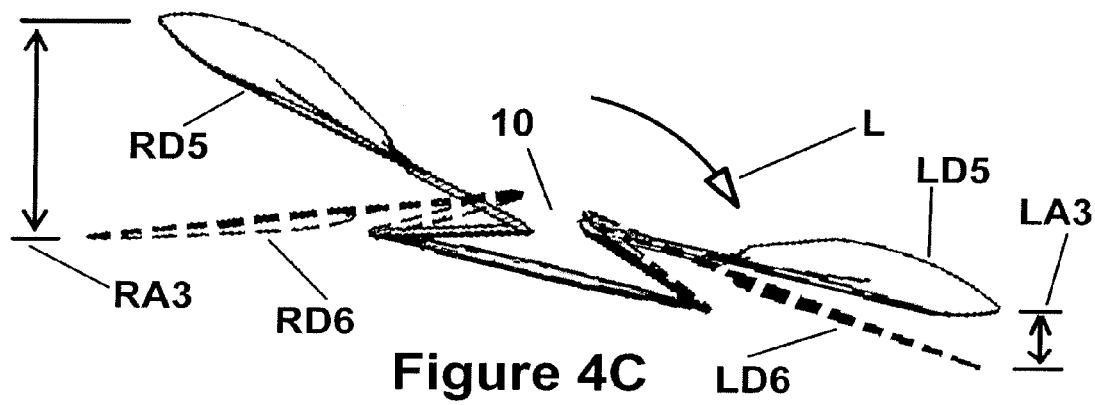

FIG. 4C shows the NAV 10 whose damped resonators are depicted at the top of wing stroke, RD5 and LD5, and bottom of wing stroke, RD6 and LD6, with its driver signal power set high and its driver signal frequency set between but closer to the natural resonance of the right damped resonator RD5 than to the left damped resonator LD5. This results in wide wing stroke amplitude on the right side RA3, and a narrow wing stroke amplitude on the left side LA3, such that there is a differential between wing stroke amplitude RA3 and LA3. Therefore, the lift on the right side of the RMA 15 is more than on the left, causing the NAV 10 to roll to the left L.

Figure 4D:
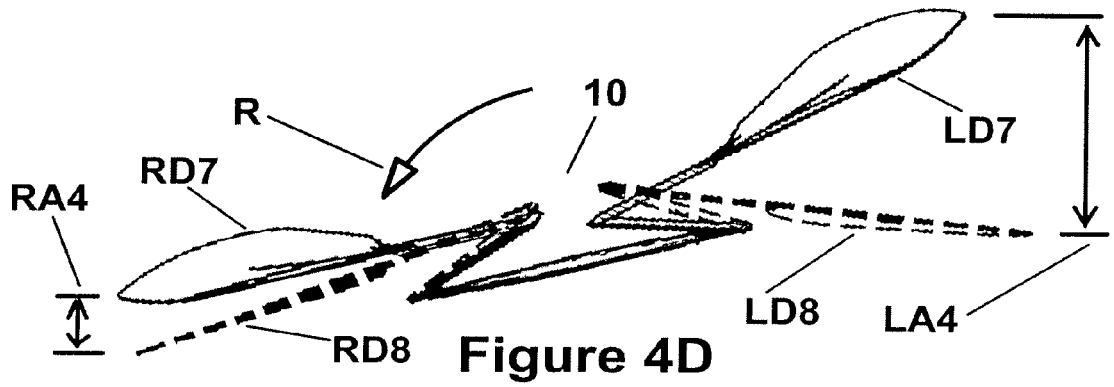

FIG. 4D shows the NAV 10 with its damped resonators depicted at the top of wing stroke, RD7 and LD7, and bottom of wing stroke, RD8 and LD8, with its driver signal power set high and its driver signal frequency set between but closer to the natural resonance of the left damped resonator LD7 than to the right damped resonator RD7. This results in wide wing stroke amplitude on the left side LA4, and a narrow wing stroke amplitude on the right side RA4, such that there is a differential between wing stroke amplitude RA4 and LA4. Therefore, the lift on the left side of the NAV 10 is more than on the right, causing the NAV 10 to roll to the right R.

Figure 5A:
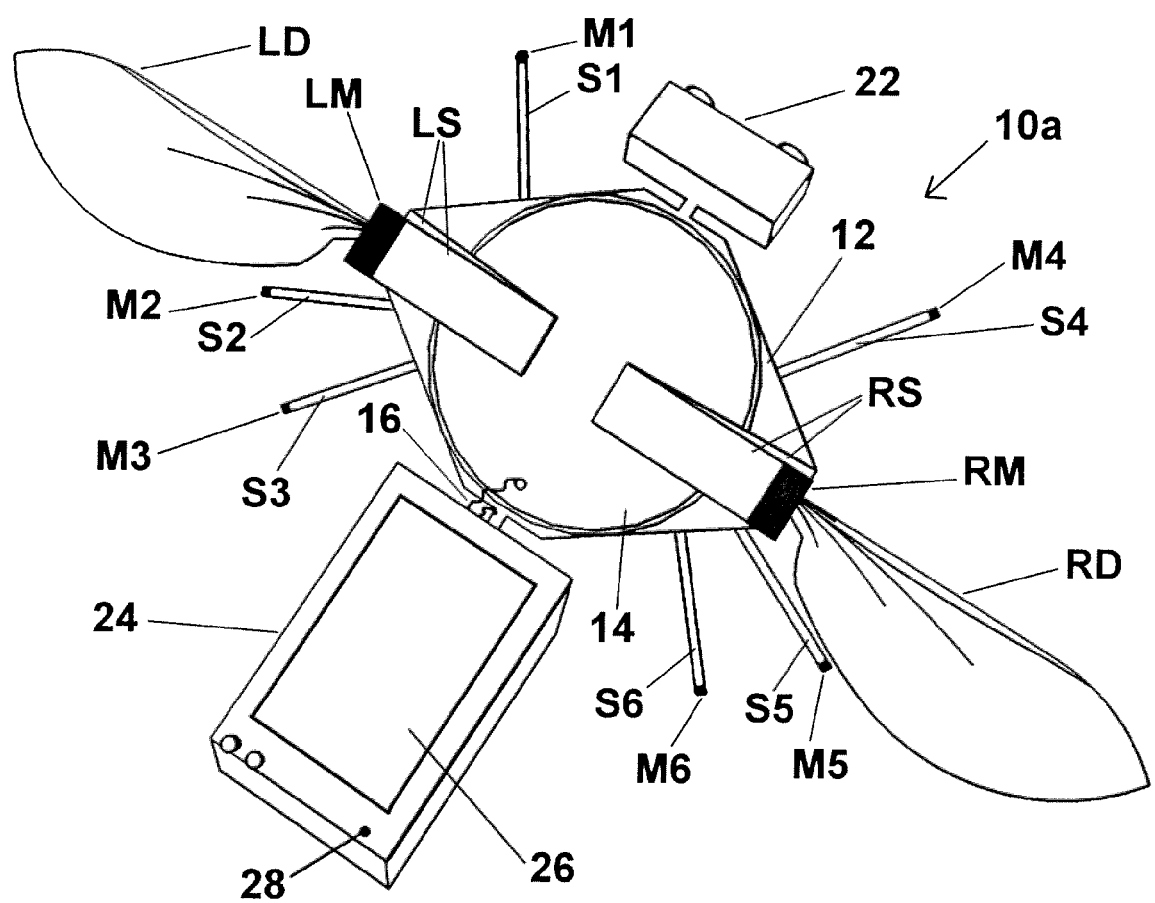
FIGS. 5A and 5B show respective top and underside views of a remote controlled micro mechanical insect incorporating a resonant engine in accordance with another embodiment of the invention, contrasting with the first embodiment by the addition of six leg resonators, a power source, telemetry and an inertial measurement unit.
Figure 5B:
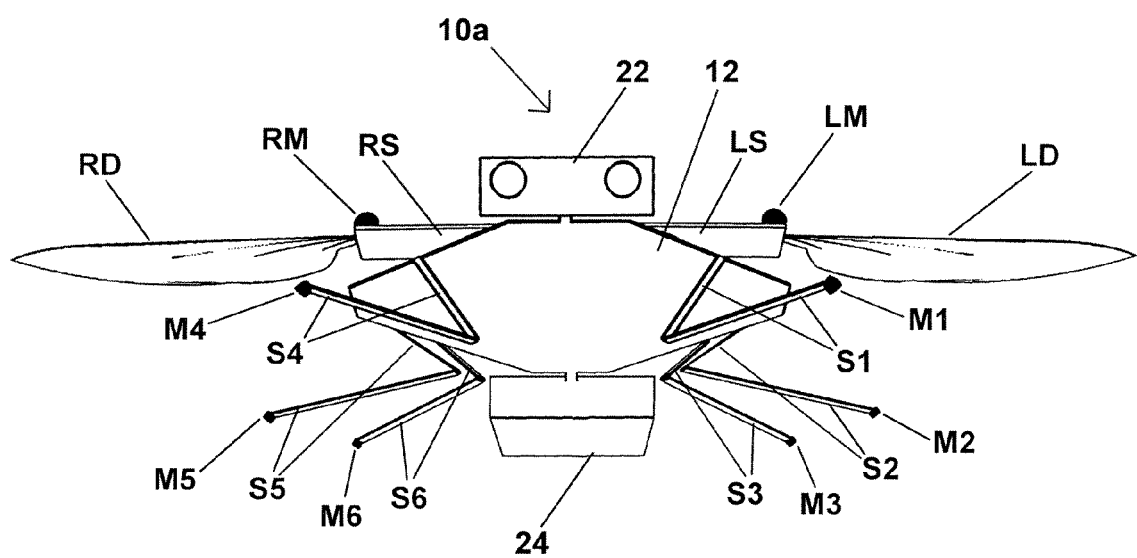

FIGS. 5A and 5B show a second embodiment of a NAV 10a, being a multi-modal NAV capable of both flight and ground locomotion. The NAV 10a is similar to the NAV 10 of the first embodiment, but includes additional components; like parts are given the same reference as for the first embodiment. Also, the oscillatory transducer 14 of this embodiment is a one-piece element, attached to just the upper side of the driver plate 12.

In addition to the left and right wings, LD and RD, six further resonators, whose natural frequencies are tuned on a different frequency band to the wing resonators and slightly tuned apart from each other, protrude downwards and act as legs for terrestrial locomotion when the NAV 10a is on a surface.

Each leg comprises a Z-fold spring S1-S6 similar to, but thinner than, the springs of the wing resonators. A proximal end of the spring is contiguously connected with the driver plate 12. A discrete mass M1-M6 is mounted at the free end of the spring.

Rather than having discrete masses M1-M6, the mass could be included in the mass of the leg springs S1-S6. By sweeping the driver signal frequency around the slightly tuned-apart leg resonators' natural frequencies, a controlled, forwards, backwards, left and right hopping vibratory locomotion is achieved as the legs at any given time that are closest in-tune with the sweeping driver frequency will react more strongly than the less in-tune leg resonators, allowing for independent control of the legs' vibratory contact force with the surface, so propelling the NAV 10a in the desired direction.

When the NAV 10a is required to switch between terrestrial locomotion and flight, it only needs to alter the driver frequency to be in-tune with the respective wing or leg resonators' natural frequencies. By sharing one driver for all motor functions, a weight reduction is achieved.

FIG. 5A-5B also show control electronics 22 attached to the driver plate 12, for environmental and inertial sensory feedback. A power module 24, including a power source, which may comprise a battery; a rechargeable battery; a nuclear battery; a cell; a rechargeable cell; a solar cell or a fuel cell, is also coupled to the driver plate 12. Means, such as a solar panel 26, may be provided to recharge the power source. The power source may, instead, be recharged by at least one energy source, such as: light impinging on the solar cell; electricity generated through external vibrational stimulus of the piezoelectric transducer; radio-isotopic decay; fuel for the fuel cell; electricity generated by a heat differential; or direct electrical coupling to an electrical charger. Alternatively or additionally, the power module 24 may include a receiver adapted to receive and rectify external electromagnetic energy into electrical energy. Examples of such receivers include: an induction coil; a photosensor; an aerial, or the like.

A hybrid energy source, comprising combinations of any of the above-mentioned power sources, may be employed.

The power module 24 may include a power control circuit and the drive signal generator (not shown). The power module 24 is electrically connected to the transducer 14 by the electrodes and associated wires 16.

The electronic control circuit may be controlled remotely, for example by means of an electromagnetic radiation remote control, with receiver 28 electrically connected to the power and control module 24.

The body of an alternative NAV could be central with two or more separate drivers and wing resonators mounted for better flight control (not shown).

More complex folds and intricate resonator spring profiled features can induce snap transitional changes at wing stroke reversal to enable powerful active wing rotation and other useful resonant frequency kinematic effects (not shown).

It will be seen from FIGS. 3A and 3B that the spring arms bend slightly during deflection. In order for the bend radius to be substantially even along the length of the spring arm, it may have a tapered profile, with less material towards the free end. More even bends correspond to greater efficiency of energy transfer.

Figure 6:
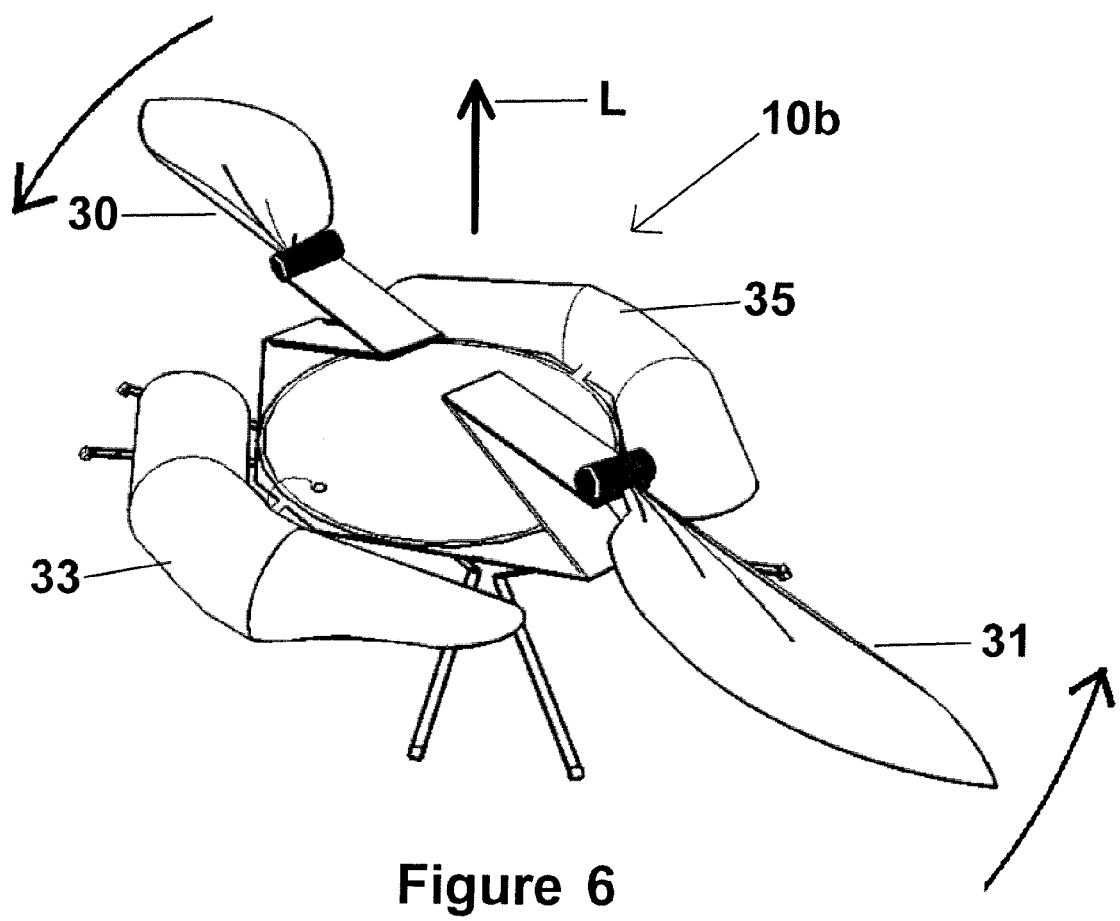
FIG. 6 shows a further embodiment of the invention having a left wing mounted oppositely to the right wing so that the whole nano air vehicle rotates in flight.

FIG. 6 shows a third embodiment of a NAV 10b, having two oppositely mounted resonator wing dampers, with their wings, 30 and 31, facing in opposite directions so the NAV, including attached power module 33 and control electronics module 35, rotates in flight for increased stability due to gyroscopic forces and increased lift L, as the NAV becomes a rotary wing aircraft powered by its flapping and rotating wings 30, 31.

Just one or any number of flapping wings, fins or other means can be employed to tap off stored resonator energy to directly or indirectly perform work in a manner to provide locomotion. If one damped resonator is used, all the mass of the power and control parts would be mounted opposite to the wing so as the resonator has an inertial mass to react against. An example of this would be a flapping and rotating single wing NAV of similar form to a sycamore seed (not shown). If more than one similar frequency damped resonator is used and they are positioned oppositely, their anti-phase reaction torques work against each other in a manner that does not require an inertial mass for the resonators to react against.

Figure 7A:
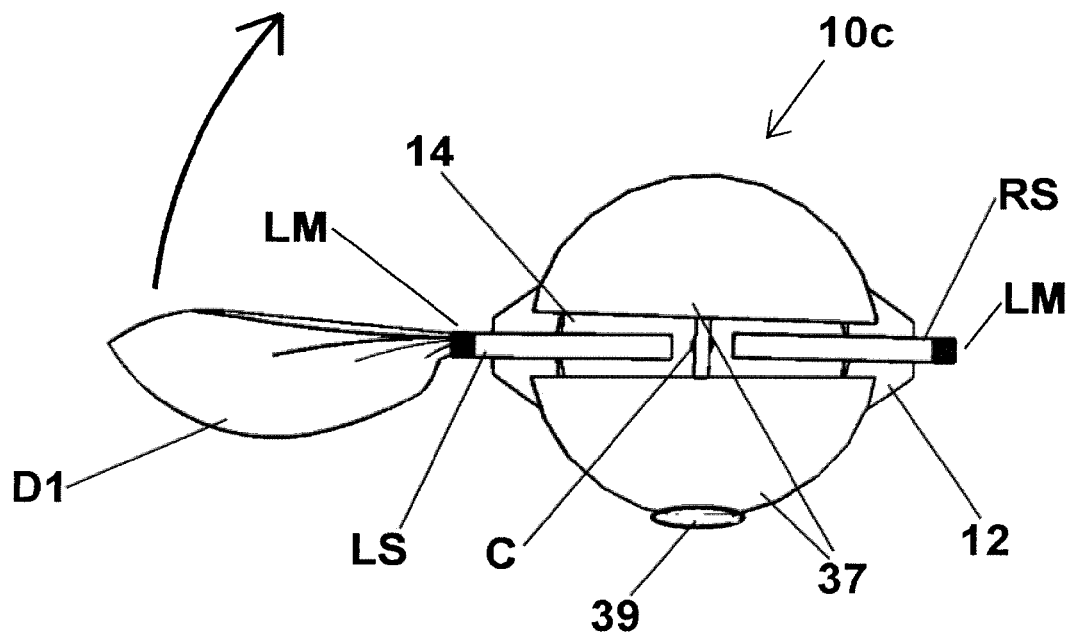
FIGS. 7A and 7B show respective top and side views of a rotating engine having two spring-mass resonators but just one wing.
Figure 7B:
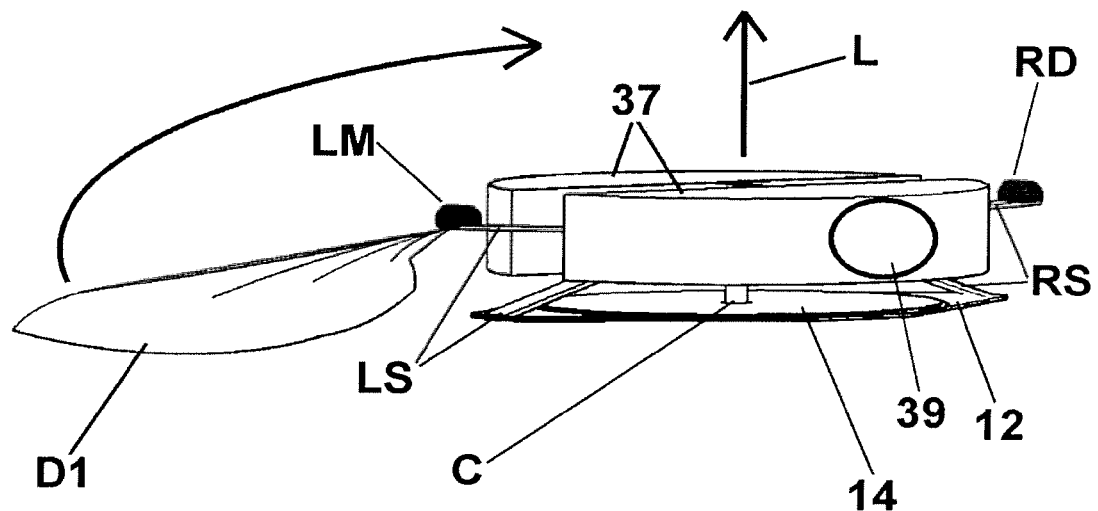

These principles are combined in the embodiment illustrated in FIGS. 7A and 7B, in which a fourth embodiment of a NAV 10c comprises a rotating NAV having two spring-mass resonators LS, LM, RS and RM but just a single wing damper D1, attached to the left resonator. The left resonator is mounted to the driver plate 12 oppositely to the right resonator. The left and right resonators are tuned to a similar frequency and, under suitable drive signal control, flap the wing D1 forcing the NAV 10c to rotate about its centre of mass C. Lift L is produced by both the flapping and rotating of the wing D1.

In such an embodiment, a power and control circuits module 37 is mounted to the centre C of the RMA. The NAV 10c has a sensor module 39, which may include magnetic and optical sensors to sense a relative point around the NAV's rotation so the NAV 10c can perform full attitude control by increasing the driver excitation signal amplitude at defined points along its rotational phase, thus momentarily increasing lift at that point.

Figure 8:
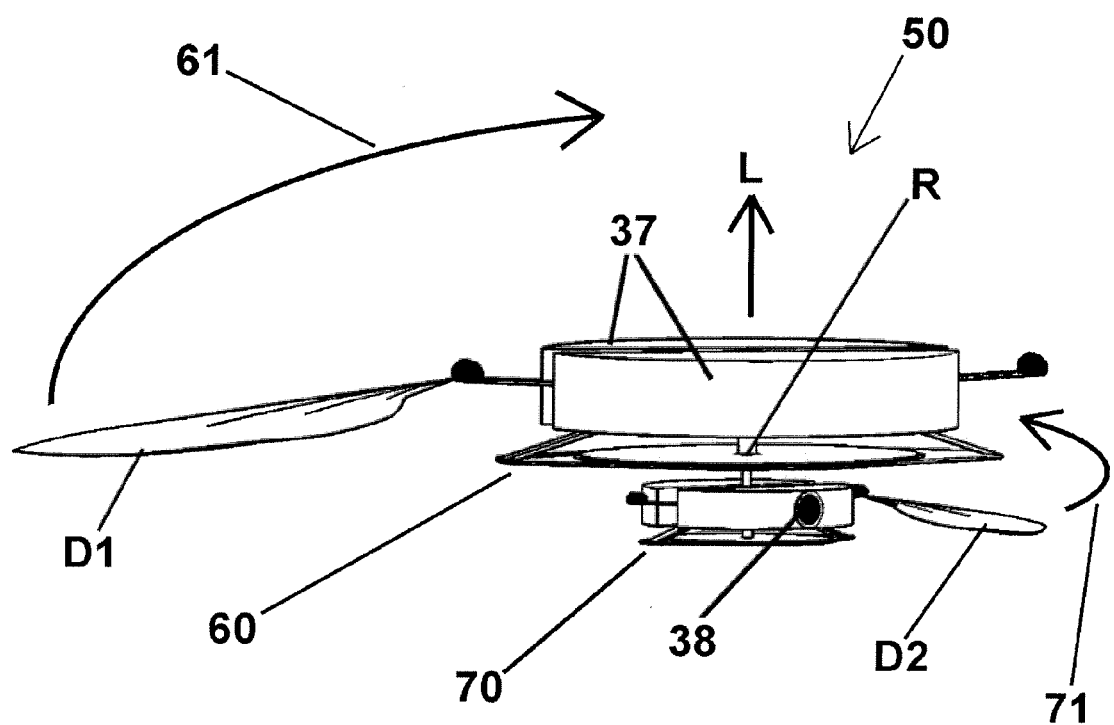
FIG. 8 shows a NAV using two resonant engines driving two counter-rotating wings.

FIG. 8 shows a fifth embodiment in which a NAV 50 comprises two RMAs driving two counter-rotating wings D1 and D2. Two single wing RMAs 60 and 70 are attached to each other using a rotary coupling R about their centre of rotation. The wing D1 of the first RMA 60 is facing the opposite way round to the wing D2 of the second RMA 70 so that their rotational directions 61, 71 are opposite. The first RMA 60, which may be broadly similar to the NAV 10c of the fourth embodiment includes a power and control circuits module 37 provides the NAV 50 with lift L and attitude correction as it rotates 61 whilst the second RMA 70 uses the thrust from its wing D2 to hold a relative rotational position about its surroundings using feedback from sensor module 38, which may include magnetic and optical sensors, much as the module 39 of the NAV 10c.

Figure 9A:
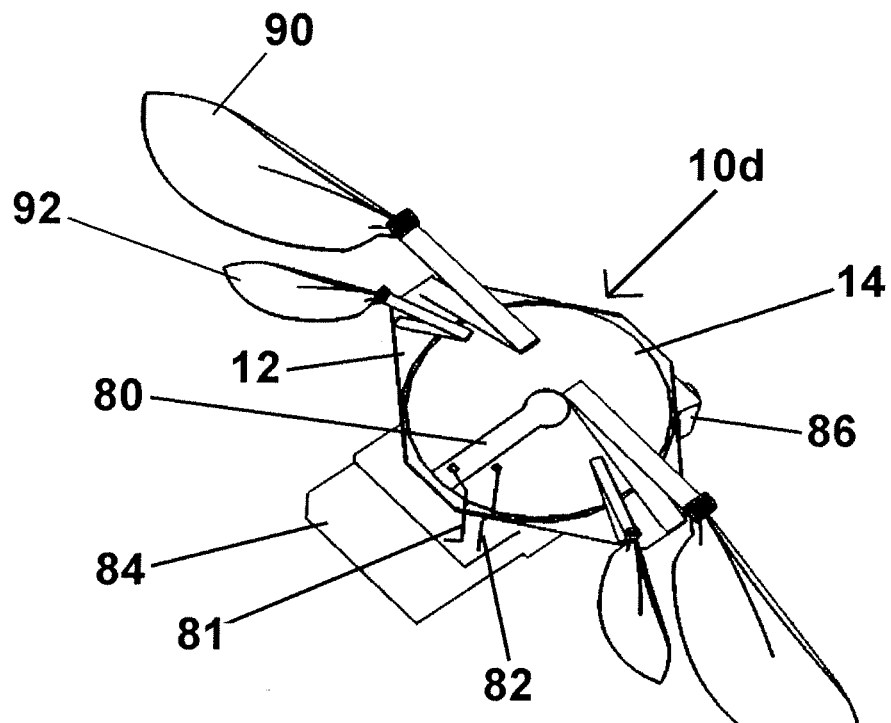
FIG. 9A shows a four-wing NAV using one resonant engine with an electrically sectioned area of the driver used for feedback sensing with power supply and control circuits attached in a central position of the engine.

FIG. 9A shows a sixth embodiment of a NAV 10d in which the transducer 14 has an electrically separated area 80 for stress-strain feedback sensing with two attached wires 81 and 82 connected to the NAV's controller electronics module 84 and sensor module 86 so that it can detect proper tuned resonance in the correct driver excitation frequencies for maximum efficiency. The NAV 10*d* has two pairs of wings: a larger pair 90 and a smaller pair 92, arranged symmetrically about an axis along the longitudinal extent of the NAV.

Figure 9B:
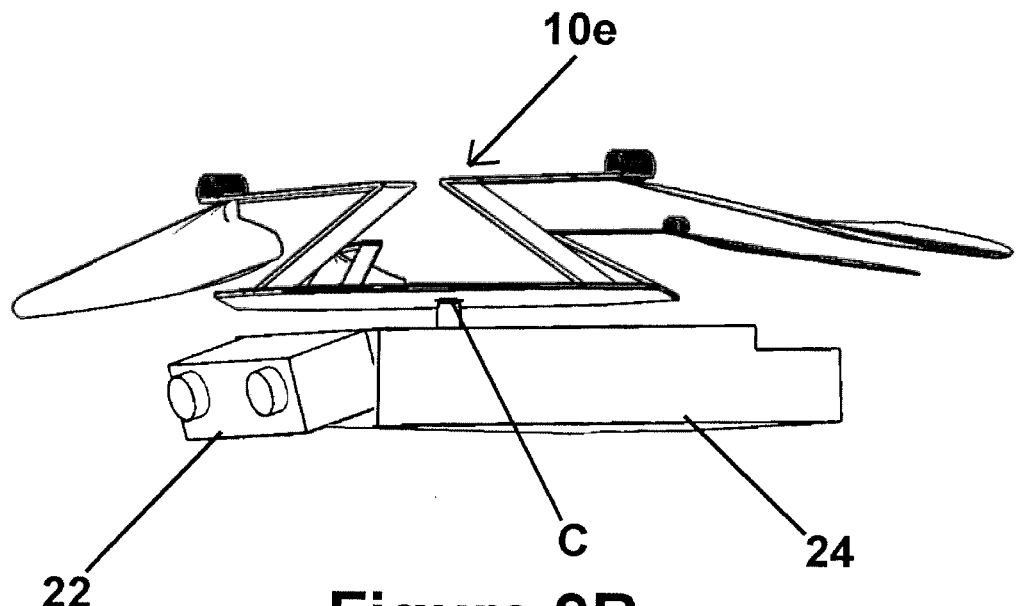
FIG. 9B shows another four-wing NAV, in which a power and control module and a sensor module are mounted below the resonant engine at a central point thereof.

FIG. 9B shows a seventh embodiment of a NAV 10*e* in which its power and control module 24 and sensor module 22 are attached below the driver plate 12 at a central point C on the RMA so as to express a minimal influence on its balanced oscillating stress-strain components.

Figure 10:
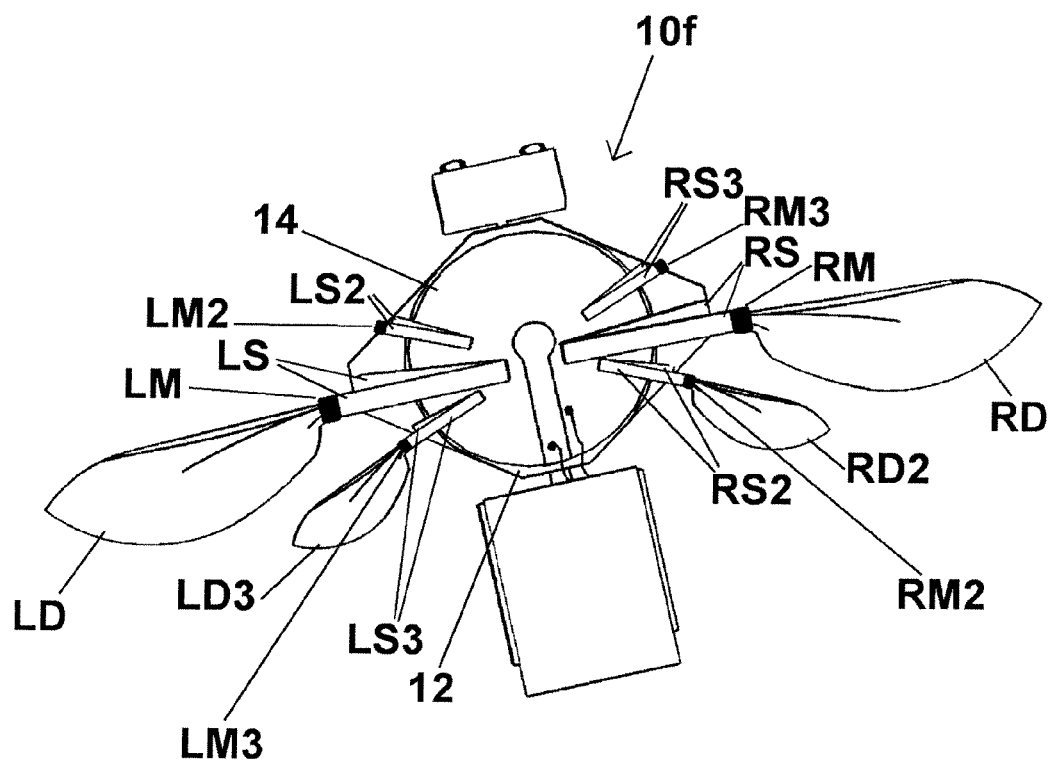
FIG. 10 shows a top view of a NAV having six spring-mass resonators and four wing dampers to achieve full attitude and thrust control using just one driver plate.

FIG. 10 shows an eighth embodiment of a NAV 10*f*, having three pairs of opposing spring-mass resonators mounted oppositely on the driver plate 12.

The two component spring-mass resonators of one pair of spring-mass resonators LS, LM, RS and RM are tuned to a similar frequency so that they respond together to a similar frequency component in the driver's signals harmonic content and have wing dampers LD and RD attached thereto to provide lift for the NAV 10*f*. The two component resonators are oppositely located along an axis on the driver plate 12 so that the torque moments resulting from the resonators cancel one another out (and cancel out the torque moments from the driver plate itself acting on that axis).

A second pair of spring-mass resonators LS2, LM2, RS2 and RM2 likewise comprises two similarly tuned components oppositely located along another axis on the driver plate 12, offset from the axis of the first pair. Only one of the spring-mass resonators RS2, RM2 of the second pair has a wing damper RD2 attached thereto. This wing RD2 provides attitude control for the NAV. The opposite component of the second pair does not have a wing damper attached to it; its sole function is to counteract the torque moments resulting from the opposite spring-mass-damper RS2, RM2, and RD2. The tuned frequency of the second pair LS2, LM2, RS2 and RM2 is different from the first pair LS, LM, RS and RM.

A third pair of similarly tuned spring-mass resonators LS3, LM3, RS3 and RM3 is similar to the second pair, but having the wing damper LD3 attached on the left side rather than the right and tuned to yet another different frequency. The axis along which the third pair is arranged is offset from the axis of the first pair by the same angle as that of the second pair, but in an opposite sense, so providing a symmetrical arrangement along a longitudinal axis of the NAV 10*f*. As with the single wing damper RD2 of the second pair, the one wing damper LD3 provides attitude control for the NAV.

This configuration allows for independent wing stroke amplitude control of the three pairs of resonating spring-mass appendages by summing three different frequency oscillatory signals of varying amplitudes (preferably sine waves) to make up the driver excitation signal, whereupon each pair of spring-mass resonators will only respond with energetic movement when the driver signal's harmonic content includes its frequency. As long as the harmonic content of the driver's excitation signal only contains frequency components similar to one or more of the three pairs of spring-mass resonators, then the driver strains will be kept to a minimum whilst efficiently maximizing the driver's oscillating stress energy's conversion to energetic movement of the wings.

This embodiment is particularly advantageous in that each pair of resonators acts as a true tuned pair, cancelling out the torque moments produced by the opposite resonator in the pair, without the need for further reaction means (such as a mass). Preferably, each pair is located along respective axes that all pass through a central point on the driver plate 12. It will be understood that rather than a single spring-mass resonator, such as RS3, RM3 being used to counteract the moments from an opposite spring-mass(-damper) resonator, such as LS3, LM3 (and LD3), the single spring-mass damper RD3, RM3 could be replaced by two or more spring-mass dampers, all tuned to the same frequency and arranged so that their summed moments counteract those of the opposite spring-mass(-damper) resonator. For example, the spring-mass resonator RS3, RM3 could be replaced by a pair of lighter-weight spring-mass resonators arranged symmetrically offset on opposite sides of the axis along which the third pair was originally aligned, the sum of the moments of the replacement pair equalling those of the spring-mass resonator RS3, RM3 (and equalling, but opposite to, those of the spring-mass(damper) resonator LS3, LM3 (and LD3).

Figure 11A:
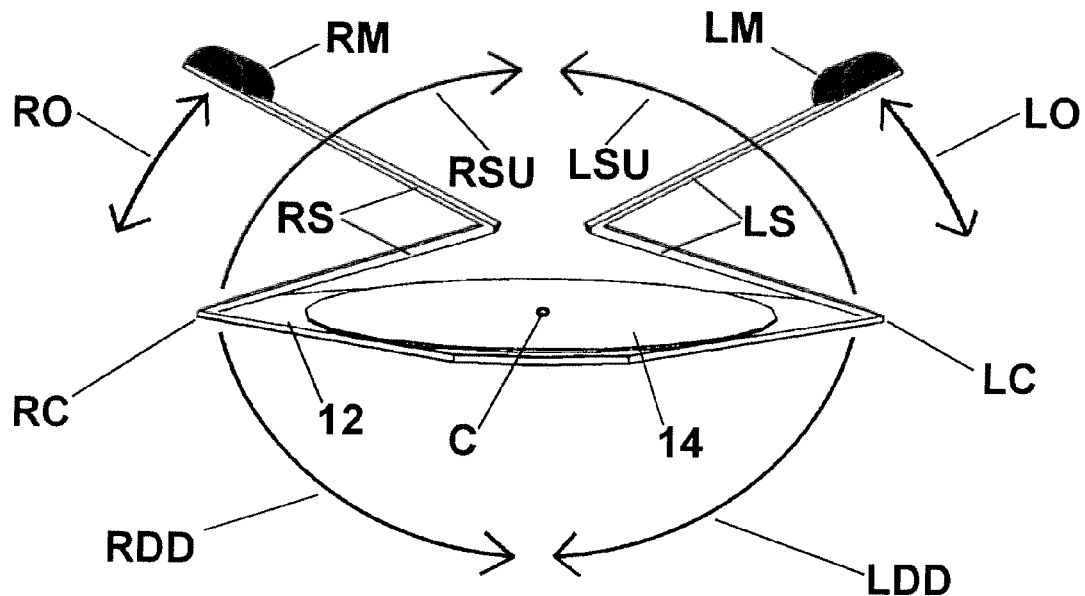
FIGS. 11A and 11B illustratively show the opposing torque vectors on the two opposing driver plate-to-spring attachment points in respective up and down cycles, when in resonant oscillation.
Figure 11B:
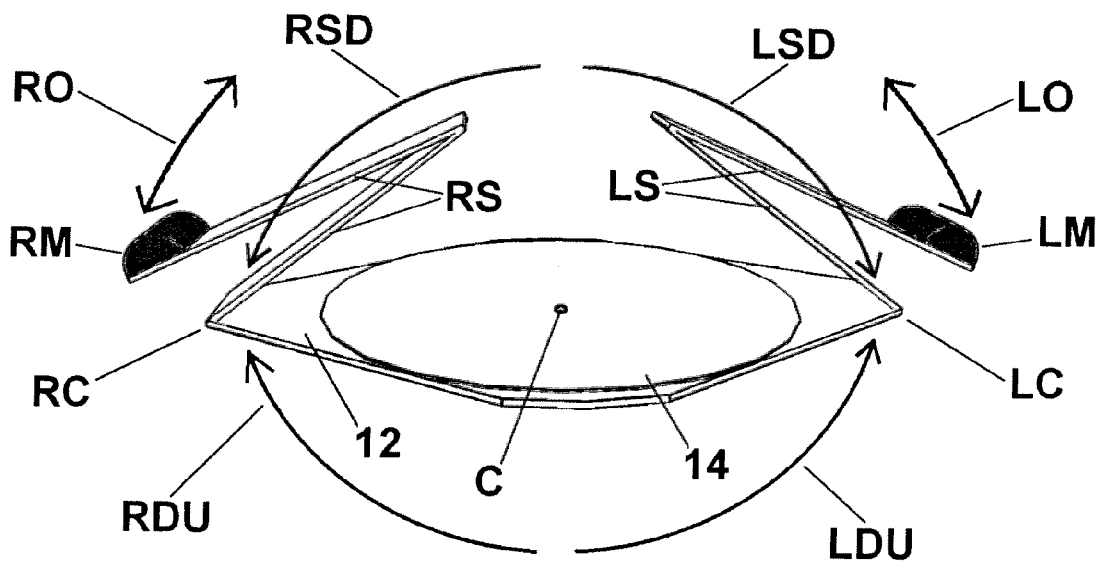

FIGS. 11A and 11B show two phases of an RMA with two oppositely attached spring-mass resonators RS, LS, RM and LM in respective up and down cycles when in resonant oscillation.

FIG. 11A shows the masses RM and LM in a high position towards the end of an up cycle. In this condition, the spring-mass resonators exert torque force vectors RSU and LSU that try to bend up the opposing ends RC and LC of the driver plate 12, where the spring-mass resonators are attached to the driver plate. Simultaneously, torque force vectors RDD and LDD of the driver plate 12, under the action of the transducer 14, try to bend down the opposing ends RC and LC.

FIG. 11B shows the masses RM and LM in a low position towards the end of a down cycle. In this condition, the spring-mass resonators exert torque force vectors RSD and LSD that try to bend down the opposing ends RC and LC of the driver plate 12. Simultaneously, torque force vectors RDU and LDU of the driver plate 12, under the action of the transducer 14, try to bend up the opposing ends RC and LC.

Throughout the cycle, the torque force vectors exerted by the spring-mass resonators tend to cancel out the torque force vectors exerted by the driver plate 12, thus substantially cancelling out the driver plate's attempted wide oscillating strains. The ends of the springs RS and LS that are attached to the driver plate 12 at connection points RC and LC preferably exhibit minimal strain with respect to a central point C. As a result, the stresses induced in the driver plate 12 by the oscillatory transducer 14 are converted not into strain (i.e. deflections) of the driver plate, but, in an efficient transfer of energy, into progressively wide strains along the length of the springs RS and LS. This results in wide energetic deflections RO and LO suitable to be coupled to one or more dampers, such as a wing, to perform work.

When piezoelectric material is used for the transducer 14, this 180° out of phase condition means that it can be driven harder than otherwise would be the case, because damage from excessive strain is prevented. Two or more spring-mass resonators can be so tuned and positioned on the driver plate 12 in a manor to effect multiple frequency selectable deformations that in groups minimize the driver strain.

Rather than having a separate oscillatory transducer 14 bonded to the driver plate 12, the two components could be formed as a unitary piece, for example by forming the entire piece from a piezoelectric material or from a material having integral active inclusions.

At small scales of around the size of a honey bee, the power density of currently available battery technology will offer only short flight durations so it is envisaged that for short distance operations say a few meters the RMA based NAVs can get their power transmitted by electromagnetic radiation to an on-board inductive coil for sustained flight and can be recharged in flight by it hovering near an electromagnetic field without the need to land.

It will be appreciated that aspects of the various embodiments described above may be combined with those of other embodiments in order to develop further alternative NAVs.

For example, the stress or strain sensor could be employed in any of the embodiments. Likewise, the power module and/or sensor module of one embodiment may be swapped for that of another embodiment. The principle of the paired tuned resonators of the embodiment of FIG. 10 can be extended to be applied in any of the other embodiments.

Some NAV designs can consist of more than one separate RMA attached to the power source, sensors and control electronics then separately controlled with different excitation signal amplitudes to offer several spatially separate thrust sources suitable for attitude orientation control.

The RMA engine principle works at a broad range of scales. For example, a large RMA could be used with appropriately designed light-weight aero-elastic wings to be a personal transporter as attached to a controlling harness on a person's back.

Piezoelectric actuation that uses small strains to do work is widespread in many products, as the RMA engine typically does not need a strong supporting frame or mass to react against and its driver typically shows negligible strains whilst in operation, it's principle can be used to make many products that use piezoelectric materials more efficient and have much less unwanted vibration, supporting framework or mass to work effectively.

In general, an RMA engine can be used as a NAV using one or more wing dampers attached to two or more spring-mass resonators that are bonded substantially oppositely on a piezoelectric driver plate. These resonating spring-mass-damper systems are excited to resonance by the driver plate and amplify the piezoelectric oscillating stress and some residual strains converting to a large rotational deflection suitable for driving the wings. The rapid wing beat dampens the resonance, tapping off energy and producing a powerful wake vortex trust. One driver is used for all motor functions.

As the amplification of the stresses and small driver strains into wide flapping wing kinematics is achieved solely by resonant movement amplification and without the use of pivotally coupled parts or other types of kinematic pair, the engine offers low friction, high speed and high efficiency ideally suited to micromechanical insect design at the NAV scale.

As the RMA motor and transmission mechanisms have no closely positioned parts, friction induced mechanical engine failure, and failure due to foreign particle contamination is low.

The cost of manufacture is low, as the whole body of an RMA, including its resonator appendages can be formed in one piece, by molding, 3-D printing, extrusion and other established manufacturing methods.

By manufacturing appropriately shaped resonators, definable amounts of 3-D passively compliant movement can be realized, thus assisting with complex insect flight kinematics, including passive wing rotation.

Mechanism complexity is low, as just a single part RMA can be shaped to have more that one resonant mechanical response to more that one driver frequency allowing for defined kinematics to be performed on demand by adjusting the driver signal to augment fight control.

Preferably, the RMA, including the wing veins are formed, as a single part, although it could be formed as an assembly of attached sub-sections.

Preferably the RMA and wing veins will be a made from a light weight and high tensile part using carbon and or ultra high molecular weight polyethylene fiber composites, although it may constitute other materials, such as carbon nanotubes and graphene.

Preferably the RMA's vibrational driver is formed as a bimorph transducer with two layers of piezoelectric material bonded to opposite sides of the body, although, it may constitute one or more piezoelectric bonded parts.

Whereas the respective pairs of resonators have generally been described as being opposite to one another on the drive plate 12, it will be understood that they could be slightly off-set from such a symmetrical alignment, although such an arrangement would likely be less efficient, unless one or more further reaction means (whether additional masses or additional resonators) is employed to balance out the forces.

The engine itself and the mechanisms for driving the wings may be formed as a single composite part. This solution reduces the weight of the insect-size device and is capable of producing high wing beat frequencies. The device replaces the thorax exoskeleton, the dorso-ventral and dorso-longitudinal insect muscles with one flexible part.

A single spring-mass resonator and driver does not exhibit wide deflections at resonance when on a light wire tether unless the opposite end of the driver is attached to a heavy base (ground) to act as a reaction means to isolate the counter bending moments. However, if two mirror image resonators are mounted to opposite ends of a driver, both resonators produce large wing deflections as the torque forces are in anti-phase so presenting each spring-mass resonator with a virtual ground.

The engine may comprise either a number of discrete elements assembled together, such as separate driver plate 12, transducer 14 and spring-mass resonators, or may be formed from a continuous part of light-weight high-tensile modulus material.

The invention claimed is:

1. A resonance engine, comprising:
a driver plate, to which is coupled at least one oscillatory transducer;
a drive signal generator for generating an electrical signal, the drive signal generator being connected to the oscillatory transducer for excitation thereof;
a first spring-mass resonator, having a first natural resonant frequency, including a first spring with a proximal end attached to the driver plate and a free distal end, and a discrete mass attached at or near the free distal end of the first spring; and
a reaction means attached to the driver plate opposite to the first spring-mass resonator;
wherein the reaction means comprises a second spring-mass resonator mounted symmetrically to the first spring-mass resonator on the driver plate, the second spring-mass resonator including a second spring with a proximal end attached to the driver plate and a free distal end, and a discrete mass attached at or near the free distal end of the second spring;
wherein when the oscillatory transducer is excited by a drive signal from the drive signal generator having a component at said first natural resonant frequency, the first spring-mass resonator oscillates at resonance, in anti-phase to the driver plate; and
wherein the spring-mass resonators are so tuned and arranged that torque force moments generated by the respective spring-mass resonators cancel each other out and cancel out torque force moments of the driver plate, thereby resulting in a system in which substantially all energy input to the driver plate is transmitted to the spring-mass resonators for deflection of the free distal ends thereof.

2. The resonance engine of claim 1, wherein the drive signal generator is adapted to generate electrical signals of variable harmonic content.

3. The resonance engine of claim 1, wherein the second spring-mass resonator, as measured in isolation, has a second natural resonant frequency, different to the first natural resonant frequency.

4. The resonance engine of claim 1, wherein the spring of the or each spring-mass resonator, together with the driver plate, comprises a Z-bend when viewed in the plane of the driver plate, the proximal end of the Z-bend being contiguous with the driver plate.

5. The resonance engine of claim 4, wherein the first spring-mass resonator further comprises a damper mounted at the free distal end of the first spring, thereby forming a first spring-mass-damper system.

6. The resonance engine of claim 1, wherein the driver plate and the or each spring are formed integrally with one another as a unitary piece.

7. The resonance engine of claim 1, wherein the oscillatory transducer comprises at least one material selected from the group consisting of: a piezoelectric material; a dielectric elastomer material; an electromechanically active material; an electromagnetic-mechanically active material; a source of nuclear direct collected-charge-to-motion induced oscillation.

8. The resonance engine of claim 1, wherein the driver plate and the oscillatory transducer are formed integrally as a unitary piece.

9. A resonance engine, comprising:
a driver plate, to which is coupled at least one oscillatory transducer;
a drive signal generator for generating an electrical signal, the drive signal generator being connected to the oscillatory transducer for excitation thereof;
a first spring-mass resonator, having a first natural resonant frequency, including a first spring with a proximal end attached to the driver plate and a free distal end; and
a reaction means attached to the driver plate opposite to the first spring-mass resonator;
wherein the reaction means comprises a second spring-mass resonator mounted symmetrically to the first spring-mass resonator on the driver plate, the second spring-mass resonator including a second spring with a proximal end attached to the driver plate and a free distal end;
wherein when the oscillatory transducer is excited by a drive signal from the generator having a component at said first natural resonant frequency, the first spring-mass resonator oscillates at resonance, in anti-phase to the driver plate; and
wherein the spring-mass resonators are so tuned and arranged that torque force moments generated by the respective spring-mass resonators cancel each other out and cancel out torque force moments of the driver plate, thereby resulting in a system in which substantially all energy input to the driver plate is transmitted to the spring-mass resonators for deflection of the free distal ends thereof;
wherein the first spring-mass resonator further comprises a damper mounted at the free distal end of the first spring, thereby forming a first spring-mass-damper system;
wherein the spring of the or each spring-mass resonator, together with the driver plate, comprises a Z-bend when viewed in the plane of the driver plate, the proximal end of the Z-bend being contiguous with the driver plate; and
wherein the damper comprises a first wing.

10. The resonance engine of claim 9, wherein the second spring-mass resonator further comprises a damper mounted at the distal end of the second spring, thereby forming a second spring-mass-damper system.

11. The resonance engine of claim 10, wherein the damper of the second spring-mass-damper system comprises a second wing.

12. The resonance engine of claim 11, wherein the second wing of the second spring-mass-damper system is oriented in the same direction as the first wing of the first spring-mass-damper system.

13. The resonance engine of claim 11, wherein the wing of the second spring-mass-damper system is oriented in an opposite direction to the wing of the first spring-mass-damper system.

* * * * *